US012737559B2

(12) United States Patent
Diesendruck et al.

(10) Patent No.: US 12,737,559 B2
(45) Date of Patent: Sep. 15, 2026

(54) CYCLE-CONSISTENT REFINEMENT OF PROMPTS PROVIDED TO MODELS

(71) Applicant: MICROSOFT TECHNOLOGY LICENSING, LLC, Redmond, WA (US)

(72) Inventors: Maurice Diesendruck, Bellevue, WA (US); Jie Zhao, Redmond, WA (US); Jianzhe Lin, Redmond, WA (US); Mingyang Xu, Redmond, WA (US); Shima Imani, Sammamish, WA (US); Gayathri Mahalingam, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 18/731,126

(22) Filed: May 31, 2024

(65) Prior Publication Data

US 2025/0371282 A1 Dec. 4, 2025

(51) Int. Cl.
*G06F 17/27* (2006.01)
*G06F 40/40* (2020.01)

(52) U.S. Cl.
CPC .................................... *G06F 40/40* (2020.01)

(58) Field of Classification Search
CPC ........ G06F 40/40; G06F 18/214; G06F 40/35; G10L 13/04; H04L 67/54
USPC .............................................................. 704/9
See application file for complete search history.

(56) References Cited

U.S. PATENT DOCUMENTS

2016/0005393 A1* 1/2016 Patil ........................ G10L 13/04 704/260

FOREIGN PATENT DOCUMENTS

CN 1951098 B * 7/2011 ............. H04L 67/54
CN 117349674 A * 1/2024 ........... G06F 18/214

OTHER PUBLICATIONS

Achiam, et al., "Gpt-4 technical report.", arXiv preprint arXiv:2303.08774, Mar. 4, 2024, 100 Pages.

(Continued)

*Primary Examiner* — Md S Elahee
(74) *Attorney, Agent, or Firm* — Benjamin Keim; Newport IP, LLC

(57) ABSTRACT

This disclosure presents a technique for enhancing the performance of models such as large multimodal models (LMMs) without retraining or fine-tuning. This technique includes an iterative refinement process implemented by three main components: a forward generator, a backward generator, and a discriminator. The forward generator translates a prompt into an output in a different modality, the backward generator translates this output back into the original modality, and the discriminator compares the prompt and the translated prompt to generate a hint for refining the prompt to reduce differences. This cycle continues until the original prompt and the translated prompt match, achieving cycle consistency. The solution offers several advantages, including improving model performance without the need for costly fine-tuning, training data, or expertise. It simplifies system complexity by not relying on external environments like compilers and APIs and uses cycle consistency as a supervisory signal to iteratively refine a prompt.

20 Claims, 8 Drawing Sheets

(56) References Cited

OTHER PUBLICATIONS

Anil, et al., "PaLM 2 Technical Report", In Repository of arXiv:2305. 10403v1, Sep. 13, 2023, pp. 1-93.
Brown, et al., "Language Models are Few-Shot Learners", Advances in neural information processing systems, vol. 33, 2020, 25 pages.
Chen, et al., "Evaluating Large Language Models Trained on Code", In Repository of arXiv:2107.03374v1, Jul. 7, 2021, 35 Pages.
Diesendruck, et al., "Learning How To Ask: Cycle-Consistency Refines Prompts in Multimodal Foundation Models.", arXiv preprint arXiv:2402.08756, Feb. 13, 2024, 18 Pages.
Goyal, et al., "Making the V in VQA matter: Elevating the role of image understanding in visual question answering.", Proceedings of the IEEE conference on computer vision and pattern recognition, 2017, pp. 6904-6913.
Gu, et al., "A systematic survey of prompt engineering on vision-language foundation models.", arXiv preprint arXiv:2307.12980, Jul. 24, 2023, 21 Pages.
Gunasekar. et al., "Textbooks are all you need.", arXiv preprint arXiv:2306.11644, Oct. 2, 2023, pp. 1-26.
Hao, et al., "Reasoning with language model is planning with world model.", arXiv preprint arXiv:2305.14992, Oct. 23, 2023, 20 Pages.
Kaddour, et al., "Challenges and applications of large language models.", arXiv preprint arXiv:2307.10169, Jul. 19, 2023, pp. 1-72.
Kahou, et al., "Figureqa: An annotated figure dataset for visual reasoning.", arXiv preprint arXiv:1710.07300, Feb. 22, 2018, pp. 1-20.
Kojima, et al., "Large language models are zero-shot reasoners", Advances in neural information processing systems, vol. 35, 2022, pp. 22199-22213.
Madaan, et al., "Self-refine: Iterative refinement with self-feedback. ", Advances in Neural Information Processing Systems 36, 2023, 61 Pages.
Pryzant, et al., "Automatic prompt optimization with"gradient descent" and beam search.", arXiv preprint arXiv:2305.03495, Oct. 19, 2023, 12 Pages.
Schick, et al., "It's not just size that matters: Small language models are also few-shot learners.", arXiv preprint arXiv:2009.07118, Apr. 12, 2021, 14 Pages.
Shinn, et al., "Reflexion: Language agents with verbal reinforcement learning.", Advances in Neural Information Processing Systems, 2023, 19 Pages.
Team, et al., "Gemini: a family of highly capable multimodal models.", arXiv preprint arXiv:2312.11805, Apr. 2, 2024, 90 Pages.
Touvron, et al., "Llama 2: Open foundation and fine-tuned chat models.", arXiv preprint arXiv:2307.09288, Jul. 19, 2023, 77 pages.
Wang, et al., "Learning correspondence from the cycle-consistency of time.", Proceedings of the IEEE/CVF conference on computer vision and pattern recognition, 2019, pp. 2566-2576.
Wang, et al., "Self-consistency improves chain of thought reasoning in language models", arXiv:2203.11171, Arxiv Cornell University, Mar. 7, 2023, 24 pages.
Wei et al., "Chain-of-Thought Prompting Elicits Reasoning in Large Language Models" Advances in Neural Information Processing Systems, vol. 35, Nov. 2022, pp. 24824-24837.
Wei, et al., "Improving generalization of image captioning with unsupervised prompt learning.", arXiv preprint arXiv:2308.02862, Aug. 5, 2023, 18 Pages.
Wei, et al., "Iterative domain-repaired back-translation.", arXiv preprint arXiv:2010.02473, Oct. 6, 2020, 10 Pages.
Wu, et al., "Autogen: Enabling next-gen llm applications via multi-agent conversation framework" arXiv preprint arXiv:2308. 08155, Oct. 3, 2023, pp. 1-43.
Yang, et al., "Harnessing the power of llms in practice: A survey on chatgpt and beyond.", ACM Transactions on Knowledge Discovery from Data, 2023, 30 Pages.
Yao, et al., "React: Synergizing reasoning and acting in language models.", arXiv preprint arXiv:2210.03629, Mar. 10, 2023, pp. 1-33.
Yao, et al., "Tree of Thoughts: Deliberate Problem Solving with Large Language Models", Arxiv Cornell University, Dec. 3, 2023, 14 pages.
Zhou, et al., "Conditional prompt learning for vision-language models.", Proceedings of the IEEE/CVF conference on computer vision and pattern recognition, 2022, pp. 16816-16825.
Zhou, et al., "Language Agent Tree Search Unifies Reasoning Acting and Planning In Language Models", arXiv:2310.04406v2, 2023, 26 pages.
Zhu, et al., "Prompt-aligned gradient for prompt tuning.", Proceedings of the IEEE/CVF International Conference on Computer Vision. 2023, pp. 15659-15669.
Zhu, et al., "Unpaired image-to-image translation using cycle-consistent adversarial networks.", Proceedings of the IEEE international conference on computer vision, 2017, pp. 2223-2232.

* cited by examiner

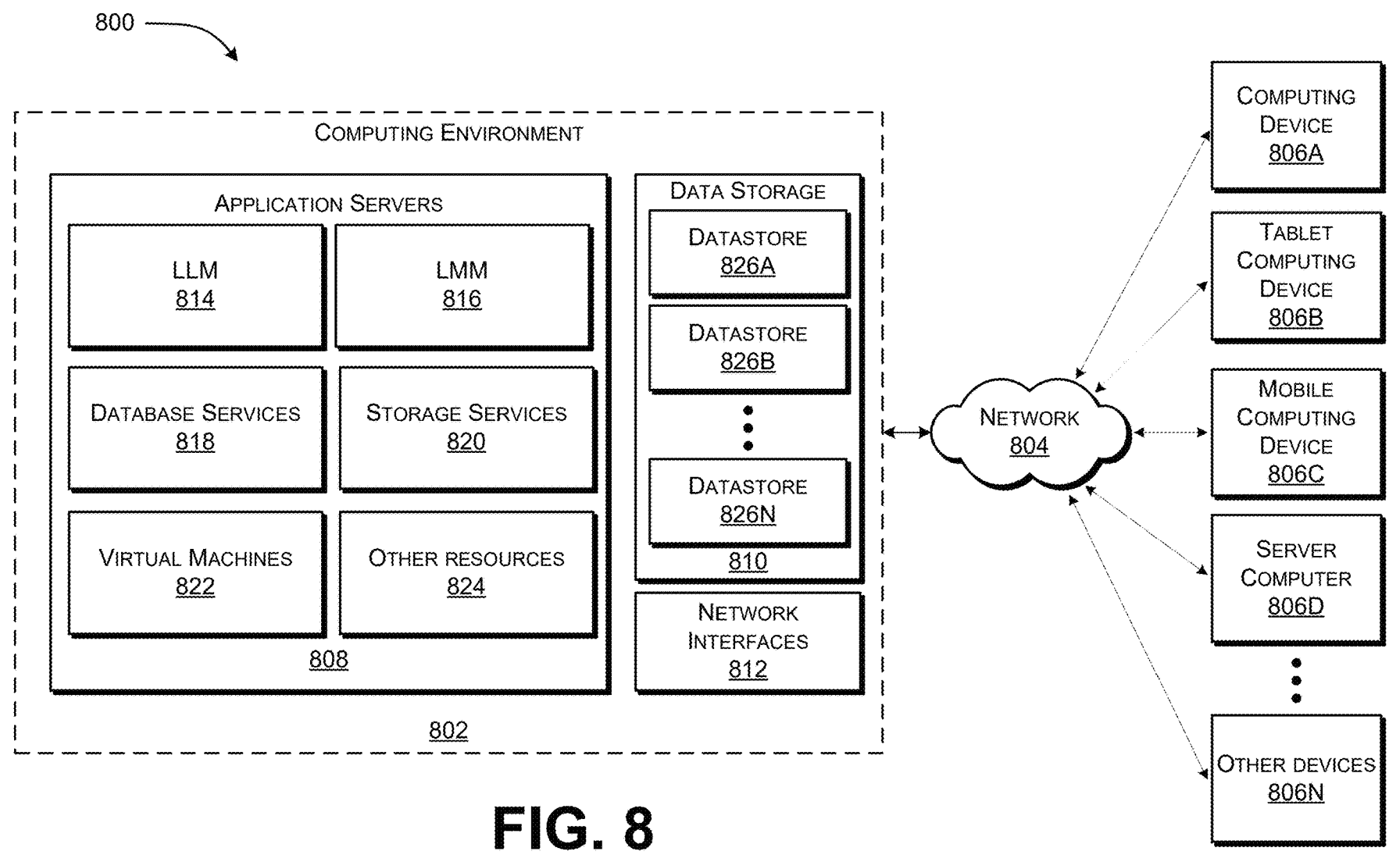

800

COMPUTING ENVIRONMENT

APPLICATION SERVERS

LLM 814

LMM 816

DATABASE SERVICES 818

STORAGE SERVICES 820

VIRTUAL MACHINES 822

OTHER RESOURCES 824

808

DATA STORAGE

DATASTORE 826A

DATASTORE 826B

DATASTORE 826N

810

NETWORK INTERFACES 812

802

NETWORK 804

COMPUTING DEVICE 806A

TABLET COMPUTING DEVICE 806B

MOBILE COMPUTING DEVICE 806C

SERVER COMPUTER 806D

OTHER DEVICES 806N

FIG. 8

CYCLE-CONSISTENT REFINEMENT OF PROMPTS PROVIDED TO MODELS

BACKGROUND

There are an increasing number of foundational models available for generative artificial intelligence (AI) applications. Foundational models are trained on broad data (generally using self-supervision at scale) and can be adapted to a wide range of downstream tasks. Examples of foundational models include the Generative Pre-Trained Transformer (GPT) series, Gemini/Bard, DALL-E2, and Synthesia. Developing a new foundational model is a highly-resource intensive process that can cost hundreds of millions of dollars, use vast amounts of compute and energy, and take several weeks or months for training alone.

Existing foundational models can be modified through retraining or fine-tuning to improve performance on specific tasks. Retraining may include a completely new training run with updated training data. This can be nearly as resource intensive as creating a new foundational model. Fine-tuning is a type of transfer learning that adapts a pre-trained model to a specific task by continuing the training process on task-specific data. This approach leverages the broad knowledge captured by the pre-trained model, potentially leading to better performance and saving significant time and computational resources compared to creating a new model or retraining a model from scratch. Yet, fine-tuning a foundational model with billions of parameters is still resource intensive and may be impractical in some circumstances. Additionally, fine-tuning creates a modified version of a foundational model which, if done repeatedly, can lead to a proliferation of task-specific models that must each be stored and maintained.

It would be desirable to be able to improve the performance of foundational models in a way that is more efficient than retraining or fine-tuning. It would also be desirable if such a technique was self-contained and did not rely on obtaining information from external environments. This disclosure is made with respect to these and other considerations.

SUMMARY

This disclosure provides a technique for cycle-consistent refinement of prompts provided to models such as large multimodal models (LMMs). The behavior of a foundational model, such as an LMM or a large language model (LLM), is modified by automatically adjusting prompts or inputs to the model to achieve cycle consistency. This technique is applied to tasks that involve changing modalities such as generating code based on a text input or generating a text summary of an image input. This approach is inspired by cycle-consistency in translation tasks, where translating a sentence into another language and back then comparing the results is used to evaluate the accuracy of translation software. Here, a prompt in a first modality is translated into a second modality by passing it through an LMM. The result is then passed back through an LMM and the twice-translated output is compared to the original input. The prompt is modified based on identified differences, and the process is repeated with the modified prompt with the aim of eliminating or minimizing the differences between successive iterations of prompts thus achieving cycle consistency. This is a way to perform in-context modification of the behavior of an LMM by altering the prompts rather than the model. The result is generally a very descriptive prompt that causes the LMM to perform a specific and consistent behavior.

The inputs, or prompts, to the LMM are changed rather than the LMM itself. Prompts can be adjusted without making any changes to the LMM and thus this technique provides an efficient way to improve the performance of an LMM. Human users when interacting with an LMM may adjust prompts to achieve a desired output. This is known as prompt engineering. The techniques of this disclosure are similar but work without a human user providing feedback. Rather than adjusting prompts to achieve the subjective result desired by a human user, cycle consistency in translations between two different modalities is used to automatically modify a prompt to achieve consistency. Thus, this is a type of self-supervised learning for refining prompts.

Each round of forward translation, backwards translation, and identification of differences is a cycle. After a cycle, the prompt is modified based on the differences and the cycle is repeated with the modified prompt. For example, a prompt may be modified to include additional detail or instructions to the LMM regarding how it should interpret the prompt. Many of the modifications could be the same types of changes a human user might make when adjusting prompts to achieve a desired output. Consistency is achieved when the prompt stops changing, i.e., stays consistent, after a cycle. For some modalities and tasks it may not be possible to achieve complete consistency. In such cases, the concept of "good enough" can be introduced by reducing the differences to less than some threshold amount.

The number of cycles needed to achieve consistency is a useful metric that can be obtained from this technique. It is a way to measure the "alignment" between two model's understanding of two modalities. The fewer the number of cycles needed to reach consistency, the better an LMM is at translating between the modalities. The higher the number of cycles, the poorer the cross-modality understanding. The number of cycles can be used as metadata to characterize LMM alignment. This can be used, for example, to compare multiple foundational models.

It is also possible that after performing this technique for many distinct prompts certain commonalities or generalizable prompt modifications may be identified. For example, it may be discovered that when translating prompts from a first modality to a second modality and then back to the first modality, the same types of differences are consistently identified, and the same modifications are applied to the prompts. This could be thought of as discovering one or more "magic phrases" that are useful to include in a wide variety of prompts. These generalizable prompt modifications can be saved and applied to future prompts at the outset to reduce the number of cycles and achieve consistency sooner.

Features and technical benefits other than those explicitly described above will be apparent from a reading of the following Detailed Description and a review of the drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 8 is a diagram illustrating a distributed computing environment capable of implementing aspects of the techniques and technologies presented herein.

DETAILED DESCRIPTION

An LMM is a computational model that integrates multiple types of data inputs, such as text, image, code, audio, and video, to perform various tasks. The term "large" refers to the scale of the model in terms of its parameters and layers, and the data it can process. Specifically, an LMM can have more than about 5 billion parameters, more than about 10 billion parameters, more than about 50 billion parameters, or more than about 100 billion parameters. In terms of layers, an LMM can have many hundreds, thousands, or tens of thousands of layers. A LMM will typically have at least about 500 layers but may have many more. The ability of LMMs to convert between multiple types of data inputs is a defining characteristic of their multimodal nature. The LMM's effectiveness and performance may depend on factors such as the quality and diversity of the training data, the specific architecture of the model, and the computational resources available for training and inference.

An LLM is a type of artificial neural network that excels in understanding and generating text that closely resembles human language. The term "large" denotes the model's scale, which is determined by its parameters, layers, and the volume of data it can process. The exact number of parameters and layers can vary, but they are typically in the billions and thousands, respectively. For example, an LLM may have more than about 1 billion parameters, more than about 5 billion parameters, more than about 10 billion parameters, more than about 50 billion parameters, or more than about 100 billion parameters. An LLM may have many dozens, hundreds, or more layers. Unlike LMMs, which are designed to process various types of data inputs, LLMs are specialized for text processing. This specialization enables LLMs to perform a wide range of tasks, including text generation, classification, and more. The abilities of an LLM are acquired through a computationally intensive training process, where the model learns statistical relationships from large volumes of text documents. LLMs may even be considered multimodal because some of these models can also translate between different modalities such as code and natural language text as well as between different human languages.

A "model," as used herein, includes foundational models, LLMs, and LMMs.

Further examples and explanations of the technologies described in this disclosure are included in M. Diesendruck et al., *Learning How To Ask: Cycle-Consistency Refines Prompts In Multimodal Foundation Models*, arXiv: 2402.08756 (2024), the entire contents of which is hereby incorporated by reference.

Figure 1:
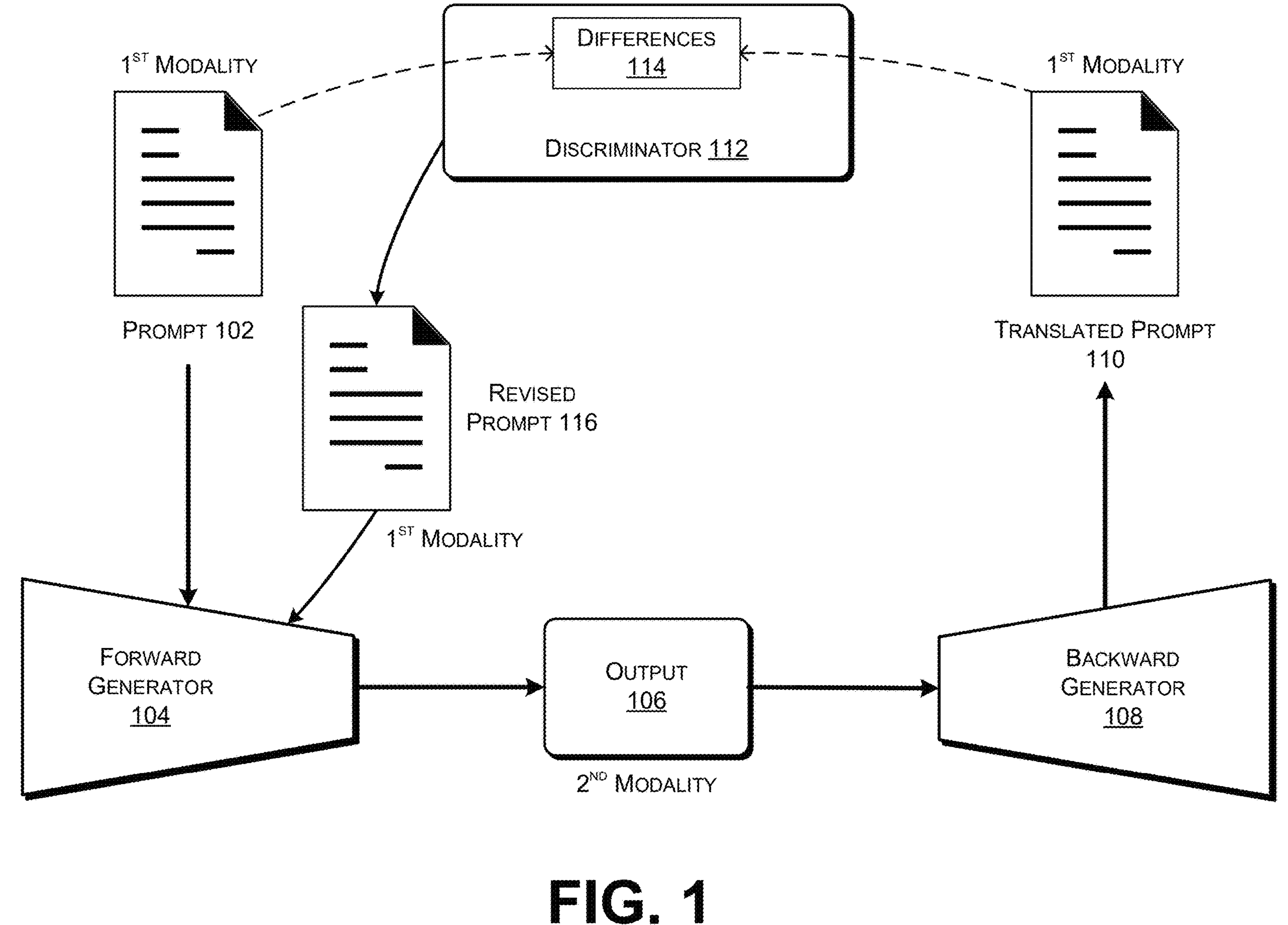
FIG. 1 is a diagram illustrating an architecture of an autoencoder-like structure for refining a prompt to achieve cycle consistency.

FIG. 1 illustrates an architecture 100 with an autoencoder-like structure for refining a prompt 102 to achieve cycle consistency. The prompt 102 is not limited to a text prompt but can be any type of input that may be provided to a model for translation into another modality. For example, the prompt 102 could be natural language text, code, a computer file, an image, a video, or an audio recording. The prompt 102 is in a first modality (e.g., text, code, image, etc.). At the start, the prompt 102 may be generated by a human user or may be a preexisting prompt (e.g., code or an image) accessed from a data store.

The forward generator 104 is a model that can translate the prompt 102 from the first modality to a second modality. Thus, the forward generator 104 may be an LMM that can understand multiple different modalities such as text and images or an LLM that can understand multiple different textual modalities such as natural language text and code. The forward generator 104 may be used without modification. That is, the forward generator 104 may be an unchanged foundational model.

The forward generator 104 generates an output 106 from the prompt 102. This may be the conventional behavior of the forward generator 104 in response to receiving the prompt 102. The output 106 is in a second modality that is different from the first modality of the prompt 102. Thus, the output 106 is necessarily different from the prompt 102 because they are in different modalities.

The output 106 is provided to a backward generator 108. The backward generator 108 is also a model that can translate an input into a different modality. Specifically, the backward generator 108 can translate information in the second modality output by the forward generator 104 back into the first modality of the prompt 102. Thus, the forward generator 104 translates "forward" from the first modality to the second modality. The backward generator 108 translates "backward" from the second modality to the first modality. Like the forward generator 104, the backward generator 108 may be an LMM or an LLM. The backward generator 108 may be the same model as the forward generator 104. Thus, the forward generator 104 and the backward generator 108 may represent a single model that can translate forwards and backward between the first modality and the second modality. However, the forward generator 104 and the backward generator 108 may also be entirely different models.

In this architecture 100, the output 106 from the forward generator 104 becomes the input to the backward generator 108. The output 106 may be thought of as a prompt provided to the backward generator 108. However, for clarity it is not referred to as a prompt to distinguish from the prompt 102. The output of the backward generator 108 is referred to as a translated prompt 110. The translated prompt 110 is in the same modality, the first modality, as the prompt 102. This is roughly analogous to starting with a sentence in English, translated into French, and then translating that French sentence back into English. The prompt 102 and the translated prompt 110 should be the same but for "errors" or information lost during the forward and backward translations.

A discriminator 112 compares the prompt 102 and the translated prompt 110 to identify any differences 114. The differences 114 can be thought of as a cycle-consistency "loss" with the goal of the entire architecture 100 to refine the prompt 102 in a way that minimizes the loss. Thus, the differences 114 may also be referred to as the loss. The discriminator 112 may be, but is not necessarily, another model. The discriminator 112 may be the same model used for either or both of the forward generator 104 and the backward generator 108. Alternatively, discriminator 112 may be a different model than either the forward generator 104 or the backward generator 108. The discriminator 112 may alternatively be created by some other techniques such as linear programming.

The discriminator 112 has two roles: the first to identify the differences 114 and the second to determine how to minimize the loss. The discriminator 112 when implemented as a model may be used with a predetermined prompt or a "hard-coded" prompt that is a task specification that tells the discriminator 112 to look for the differences 114 between the prompt 102 and the translated prompt 110. For example, a predetermined prompt used with the discriminator 112 may be something like: "Identify differences between the prompt 102 and the translated prompt 110. Then, suggest ways to minimize those differences." The discriminator 112 as an LLM or LMM may inherently have the ability to understand the prompt and perform the specified task without any modification or customization.

The discriminator 112 formulates an update to the prompt 102 referred to as a revised prompt 116. This may be done by the discriminator 112 creating what is referred to herein as a "hint." The hint is a description of how the prompt 102 should be revised. The hint may provide additional details or instructions for revising the prompt 102. The revised prompt 116 may be the prompt 102 with the hint added to it so that it still retains all of the prompt 102 but now includes additional information. Alternatively, the revised prompt 116 may be a new prompt that is not created simply by adding the hint to the prompt 102 but by creating a new prompt based on the hint. In this implementation, the revised prompt 116 may not include any, or all of the same data as in the prompt 102. For example, the revised prompt 116 may be more detailed or more descriptive than the prompt 102. The revised prompt 116 is also in the first modality which is the same modality as the prompt 102 and the translated prompt 110. The revised prompt 116 is generated by the discriminator 112 based on the differences 114 identified between the prompt 102 and the translated prompt 110. Thus, the changes between prompt 102 and the revised prompt 116 are created by the discriminator 112 specifically in response to the differences 114.

The revised prompt 116 is then provided to the forward generator 104. This represents one cycle or iteration. A given cycle, i.e., $cycle_i$, begins when the prompt 102 is provided to the forward generator 104 and the next cycle, i.e., $cycle_{i+1}$, begins when the revised prompt 116 is provided to the forward generator 104. The revised prompt 116 represents an attempt by the discriminator 112 to create a prompt that will result in the translated prompt 110 being more similar to it following passage through the forward generator 104 and the backward generator 108. Thus, if the discriminator 112 is able to modify the prompts to approach cycle consistency, the differences 114 between the revised prompt 116 and the translated prompt 110 will be fewer than the differences 114 between the prompt 102 and the translated prompt 110.

This cycle repeats with the differences 114 decreasing each iteration. This may continue until the discriminator 112 determines that the differences 114 are zero or less than some threshold level. A lack or decrease of differences does not necessarily require that the revised prompt 116 and the translated prompt 110 become identical. Rather a lack of contradiction is more important. A translated prompt 110 that includes more details or information can result in the same or similar output 106 as a sparser, revised prompt 116. Thus, a lack of differences 114 is not just a bi-directional match between the revised prompt 116 and the translated prompt 110 but a superset relationship in which the translated prompt 110 is a superset of the revised prompt 116 with lack of contradiction.

If the discriminator 112 is able to effectively revise the prompts, there will be some number of cycles before there are no longer any differences (or less than a threshold amount of difference) between the revised prompt 116 provided to the forward generator 104 and the translated prompt 110 output by the backward generator 108. This number of cycles may be used as a metric, as a form of metadata, to measure how well the forward generator 104 and the backward generator 108 are able to translate between the first modality and the second modality. Convergence that can be achieved with few cycles indicates that the models are well aligned and information in the first modality can be reliably and accurately translated into the second modality. A greater number of cycles required to reach convergence indicates that the models are not well aligned and it is difficult to design prompts that can be translated from the first modality to the second modality and back. It is also possible that for some models and modalities convergence cannot be achieved. The differences will decrease to a certain extent but even an infinite number of cycles would not result in convergence.

In some implementations, rather than repeating until the differences 114 reach zero, the operations could be repeated for a fixed number of cycles. The fixed number of cycles may be set at any arbitrary number. The fixed number of cycles may be determined based on an amount of resources such as compute available to perform a task. The fixed number of cycles may be derived from past use of the architecture 100 which identifies how many cycles typically achieve a satisfactory result.

Test data or training data can be used to evaluate how many cycles are necessary to achieve a satisfactory result. The training data may comprise a labeled data set that includes pairs of prompts in the first modality and outputs and the second modality. The results of this technique may be evaluated by a human user to determine when the differences 114 are small enough to consider that a satisfactory result has been achieved. Thus, the concept of a satisfactory result may represent a subjective human evaluation of the differences 114 between the prompt 102 and the translated prompt 110. This can be repeated for multiple different prompts 102 to determine the number of cycles to iterate. The average or median number of cycles identified by testing with multiple different prompts from the training data may be set as the fixed number cycles to use. This same number of cycles can then be used with new prompts 102.

The architecture 100 operates in the absence of external feedback, training data, or expertise. Cycle consistency alone is sufficient. For example, there is no feedback from external environments (e.g., compilers, APIs) into a text summary that is added as additional context to revise the prompt. This technique is fully self-contained and can work with translation between any modalities because the modification is performed in the input space rather than by modifying or adjusting the forward generator 104 or the backward generator 108. It is also compatible with any type of model because the revisions to the prompt 102 will be based on the goal of achieving cycle consistency which can be recognized no matter how the models underlying the forward generator 104 and the backward generator 108 operate.

Figure 2:
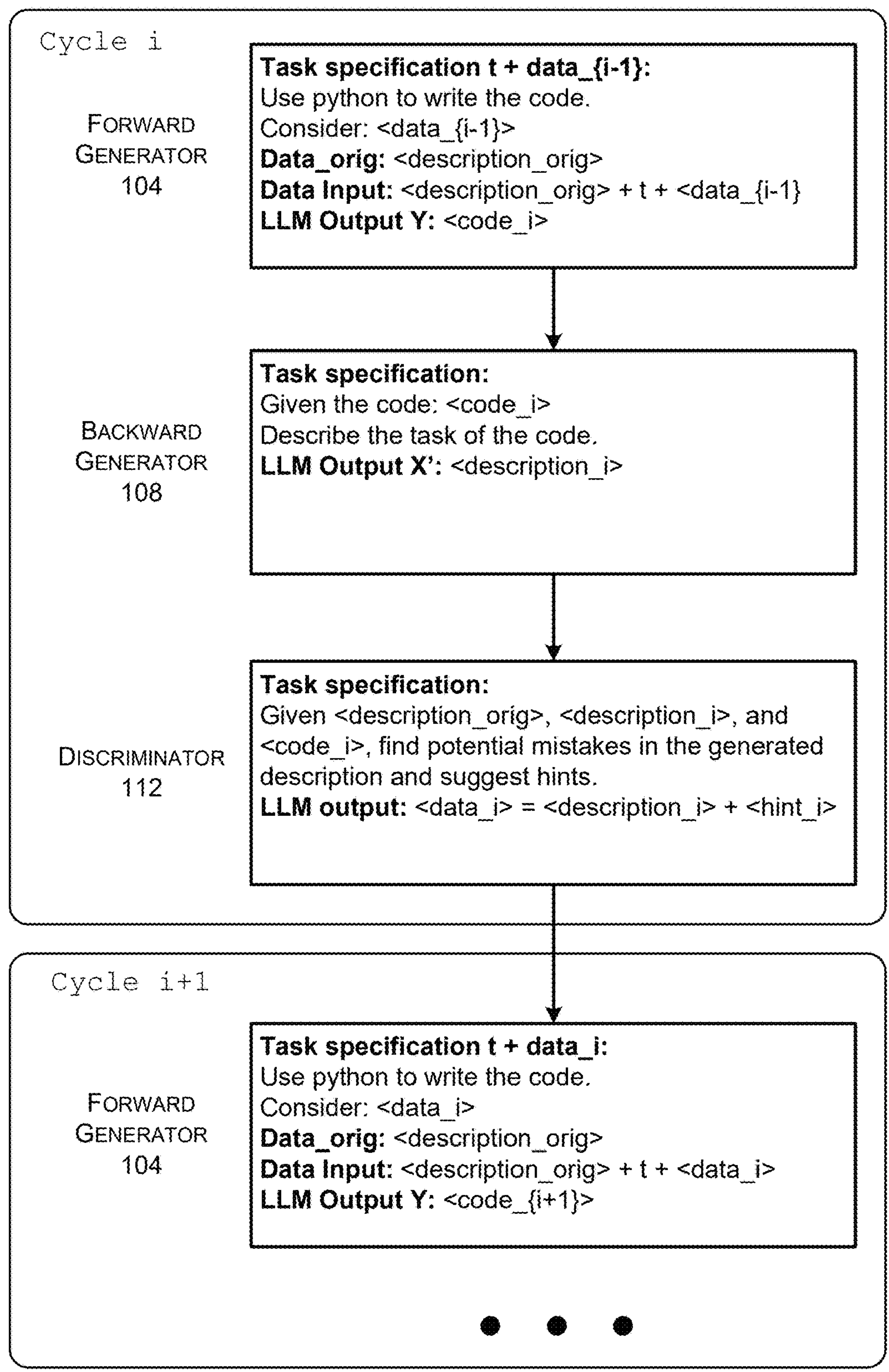
FIG. 2 is a diagram illustrating a portion of an iterative cycle showing operations of a forward generator, a backward generator, and a discriminator during prompt refinement for code generation.

FIG. 2 illustrates a portion of an iterative cycle 200 showing operations performed by a forward generator 104, a backward generator 108, and a discriminator 112 during prompt refinement for code generation. The iterative cycle 200 may be implemented by the architecture 100 introduced in FIG. 1, the computer architecture 700 introduced in FIG. 7, or the computing environment 800 illustrated in FIG. 8.

In this code generation example, the prompt is natural language text describing a coding task and the output is the code itself. Thus, the first modality is natural language text and the second modality is software code. This is a "Specification-Completion-Specification" cycle going from Text to Code and then back to Text. In some implementations, the prompt consists of two parts, a task specification t and the input data s to which the task applies. In this example, the task specification may be "use Python to write the code" and the input data is a textual description of the desired functions of the code. A textual description of the function of the code is then generated.

This iterative cycle 200 is illustrated as beginning with cycle i. The operation of the forward generator 104 can be represented by a forward function $f(x)=y$ (i.e., text→generated code). Thus, the forward generator 104 is responsible for generating an output y given an input data x. In some implementations, the input data x comprises the task specification t and the input data s, thus $x=t+s$. The operation of the backward generator 108 can be represented by a backward function $g(y)=x$ (i.e., code→generated text). The backward generator 108 translates the output of the forward generator 104 back into the original space as s'. Thus, a natural language description of the coding task is s and the description of the generated code is s'. This provides two descriptions of the code in the same modality, natural language text, that can be compared to each other.

The discriminator 112 identifies differences between the text and the generated text as a loss determined by comparing x and $g(f(x))$. The discriminator 112 works iteratively from cycle to cycle. The discriminator 112 takes as input the original data s, output y, and output from backward generator 108 $s'=g(y)=g(f(t+s))$, and produces a hint, hint=d (s, s', y). The hint is used to update the current value of s for the next cycle illustrated here as cycle i+1. Thus, the discriminator 112 considers three things: the original description s, the new description s', and the generated code y. By comparing the two descriptions s and s' the discriminator 112 can determine a better task description t that would produce code whose description is consistent with the original task description. The hint is generated based on the inconsistency between the currently generated data s' and the original data s. The hint may include additional details that are not in the original prompt but that help achieve the correct output from the forward generator 104. It is not necessarily a match but and expansion that does not contradict the original.

The next cycle is cycle i+1. It begins with the operation of the forward generator 104 functioning the same as it did in the previous cycle but now with revised data. This process is repeated for N cycles to achieve cycle-consistency, i.e., Consistent(s, s')==True. For simplicity, the remainder of cycle i+1 is not shown nor are cycle i+2 and any subsequent cycles. The goal is to minimize inconsistency between the original data s and the translated output s', thereby improving the performance of the model. In some implementations, the ultimate goal is to get the final output $y_N$ which will be a translation into the second modality is more accurate than it would have been without this iterative cycle 200.

The discriminator 112 may be provided with a predetermined task specification that instructs it to make the comparison and suggest revisions such as: "Find potential mistakes in the generated description and suggest hints." In this example, the forward generator 104, the backward generator 108, and discriminator 112 can all be implemented with the same model such as GPT-4. GPT-4 is an LLM that uses a transformer-style architecture for understanding relationships between words in text. It comprises an encoder for transforming inputs into vector representations, a decoder for generating text outputs from these representations, and an attention mechanism for focusing on relevant parts of the inputs and outputs.

Although this technique can be performed without outside tooling or support infrastructure such features may be added. This would be done by using external feedback about the code such as that provided by a compiler or interpreter. Thus, rather than relying solely on the understanding of the code by the discriminator 112, the code would be tested and evaluated to determine its functionality. The functional behavior of the code, identified errors, and the like can then be added as additional information that is used when determining if there is cycle convergence.

Figure 3:
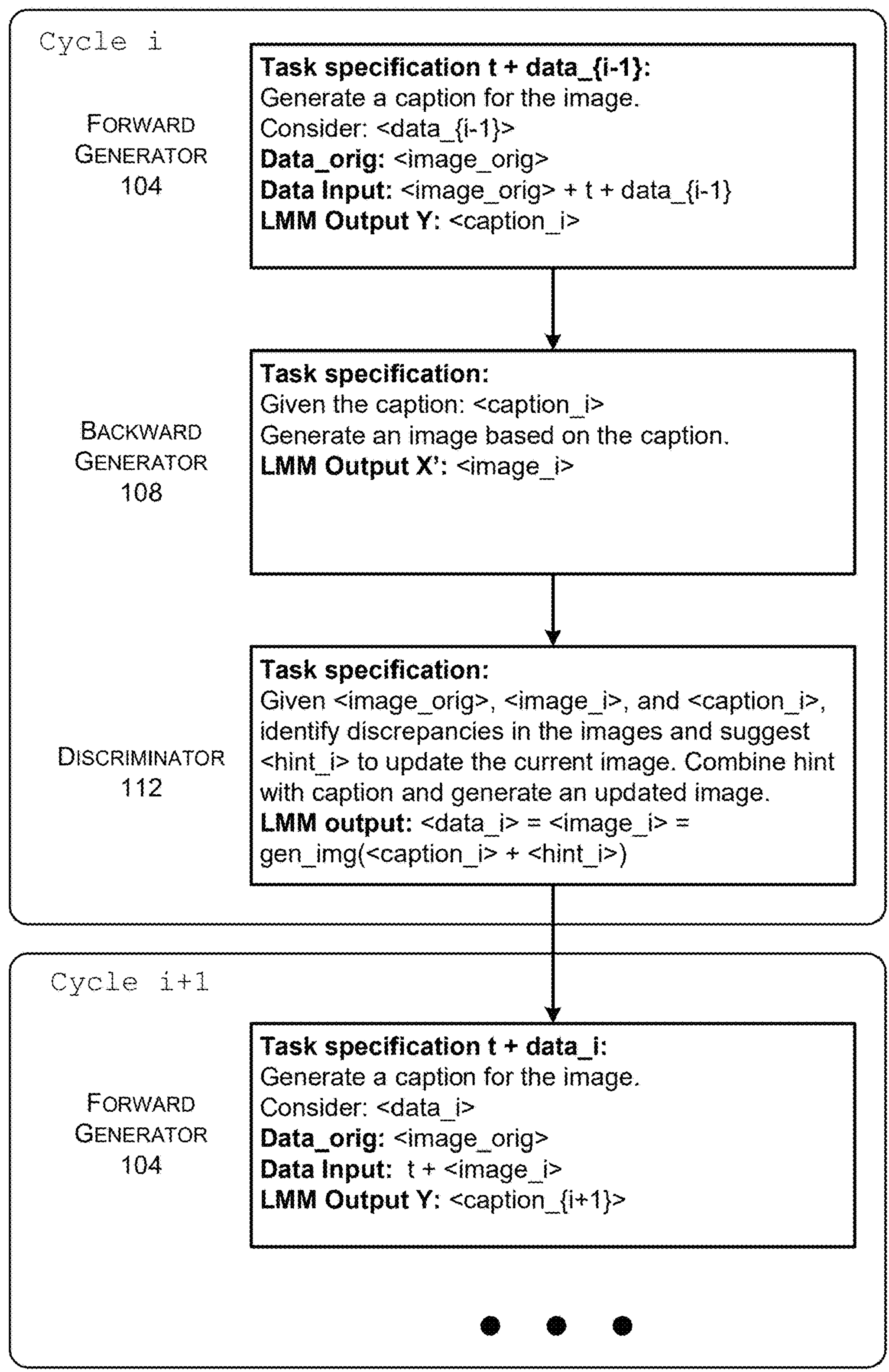
FIG. 3 is a diagram illustrating a portion of an iterative cycle showing operations of a forward generator, a backward generator, and a discriminator during prompt refinement for image captioning.

FIG. 3 illustrates a portion of an iterative cycle 300 showing operations performed by a forward generator 104, a backward generator 108, and a discriminator 112 during prompt refinement for image captioning. The iterative cycle 300 may be incremented by the architecture 100 introduced in FIG. 1, the computer architecture 700 introduced in FIG. 7, or the computing environment 800 illustrated in FIG. 8.

Image captioning in this example comprises Image-Text-Image cycles. The forward generator 104 takes an image as input and generates a caption as output. The backward generator 108 takes that caption and generates an image. Thus, in this example the prompt is an image and that output is natural language text. The discriminator 112 compares the input image and the image generated by the backward generator 108. The task specification t may include instructions to the forward generator 104 in natural language texts such as "generate a caption for the image." The input data s is the image. The iterative cycle 300 is performed using an LMM because the translations are between two different modalities: images and text.

The discriminator 112 considers three things when generating a hint, the original image, the new image, and the generated caption. The discriminator compares the two images and then creates an updated caption and a subsequently-generated image from that caption. The updated caption can be used by the backward generator 108 to generate an image that matches the original. The discriminator 112 may include a pre-predetermined task specification such as "identify discrepancies in the images and suggest a hint to update the current image." The hint can then be combined with the current caption and a new image generated by the forward generator 104. If the generated image matches the current image there is cycle consistency. Images are higher-complexity and detail-rich compared to textual captions which are lower-complexity naturally summarizing. This was found to lead to convergence because the generated captions are always less detailed than the corresponding images.

In an implementation, the forward generator 104 is GPT-4V, the backward generator 108 is DALL•E-3, and the discriminator 112 is an independent instance of GPT-4V. However, other models may alternatively be used. GPT-4V (Vision) is an extension of GPT-4 that enables users to instruct the model to analyze image inputs thereby incorporating image modalities into a large language model originally designed for processing text. DALL•E-3 is an artificial intelligence model that has the capability to generate images from textual descriptions, using a pre-trained language model CLIP and a transformer-based neural network.

Although the modalities are different, the iterative cycle 300 for image captioning can be represented mathematically in the same way as the iterative cycle 200 for code generation. This mathematical representation and the following pseudocode are generalizable and apply to any modalities. The following mathematical formulation more closely specifies the function inputs and outputs, noting the cycle indices. The forward generator 104 is represented by $f: X \rightarrow Y$, the backward generator 108 is represented by $g: Y \rightarrow X$, and the discriminator 112 is represented by $d: X \times X \times Y \rightarrow X$. Consider for cycle i, there is task specification t, original data $s_0$, current data $s_i$, current input $x_i = t + s_i$, and current output $y_i = f(x_{i-1})$. The discriminator compares $s_0$ and $s_i$ to produce a hint, i.e. $d(s_0, s_i, y_i) \rightarrow \text{hint}_i$. This hint is used for two updates: updating the current data $s_{i+1} = s_i + \text{hint}_i$ and updating the current input $x_{i+1} = t + s_{i+1}$. The iterative refinement process is performed until a termination condition is reached which could be a predetermined number of N times or until $s_0$ and $s_i$ are consistent. This is formalized as:

$$x_0 = t + s_0 \tag{1}$$

$$y_i = f(x_{i-1}) = f(t + s_{i-1}) \tag{2}$$

$$s_i = g(y_i) \tag{3}$$

$$x_i = t + si \tag{4}$$

$$\text{hint}_{i+1} = d(s_0, s_i, y_i) \tag{5}$$

$$s_{i+1} = s_i + \text{hint}_{i+1} \tag{6}$$

$$x_{i+1} = t + s_{i+1} \tag{7}$$

This can also be represented in pseudocode as shown below. The pseudocode shows an algorithm that will end after a predetermined number of cycles or earlier if cycle consistency is achieved. Thus, in some implementations both a predetermined number of cycles and cycle consistency can be used as termination conditions.

```
Input: original data s0, task specification t, input xi = t + si
number of cycles N, forward generator f, backward
generator g, discriminator d
```

-continued

```
Apply initial cycle g (f (x0)) = g (y1) = x1.
for i = 1 to N − 1 do
  Apply f to xi−1 to get yi = f (xi−1)
  Apply g to yi to get g (f (xi)) = si
  Apply d to (s0, si, yi) to get hinti+1
  Update xi+1 = t + si + hinti+1
  if Consistent (s0, si+1) then
    Break
  end if
end for
```

The techniques illustrated in FIGS. 1, 2, and 3 can produce state-of-the-art performance without external tooling, but the utility depends on the strength of the forward generator 104, the backward generator 108, and the discriminator 112. Testing shows that the forward generator 104, in some implementations, is the most important, followed by the discriminator 112, and finally the backward generator 108. The forward direction is important because, without a strong forward generator 104, the system cannot execute on feedback. In the Text-Code-Text cycle illustrated in FIG. 2, the forward generator 104 (GPT-4) is extremely responsive to changes in input text and faithfully translates text instructions into code. In the Image-Text-Image cycle illustrated in FIG. 3, the forward generator 104 (GPT-4V) also reliably provides accurate descriptions for images. Without being bound by any particular theory, it is believed that without a good forward generator 104, the system could not improve, even with a good signal.

The discriminator 112 is of secondary importance because it defines the upper limit of how much refinement this process can deliver. The sensitivity and the perception of the discriminator 112 limits the differences that can be detected and corrected. If the discriminator 112 lacks sufficient sensitivity, two prompts may be identified as the same when in fact they are different. Because instructions are passed via text, the accurate language understanding of the discriminator 112 (GPT-4 for code generation and GPT-4 for image captioning) cause it to be very sensitive to differences.

Finally, a strong backward generator 108 is preferable, but this technique can still produce useful results with a weak backward generator 108. This is most evident in the Image-Text-Image cycle shown in FIG. 3, where image generation is weaker, i.e. generated images frequently do not comply with highly detailed captions. However, because the backward generator 108 (DALL•E-3) samples in a neighboring semantic space and is paired with a good discriminator 112 (GPT-4V), the output from the backward generator 104 is still useful for informing revisions to increase the precision of the original image caption.

Illustrative Methods

Figure 4:
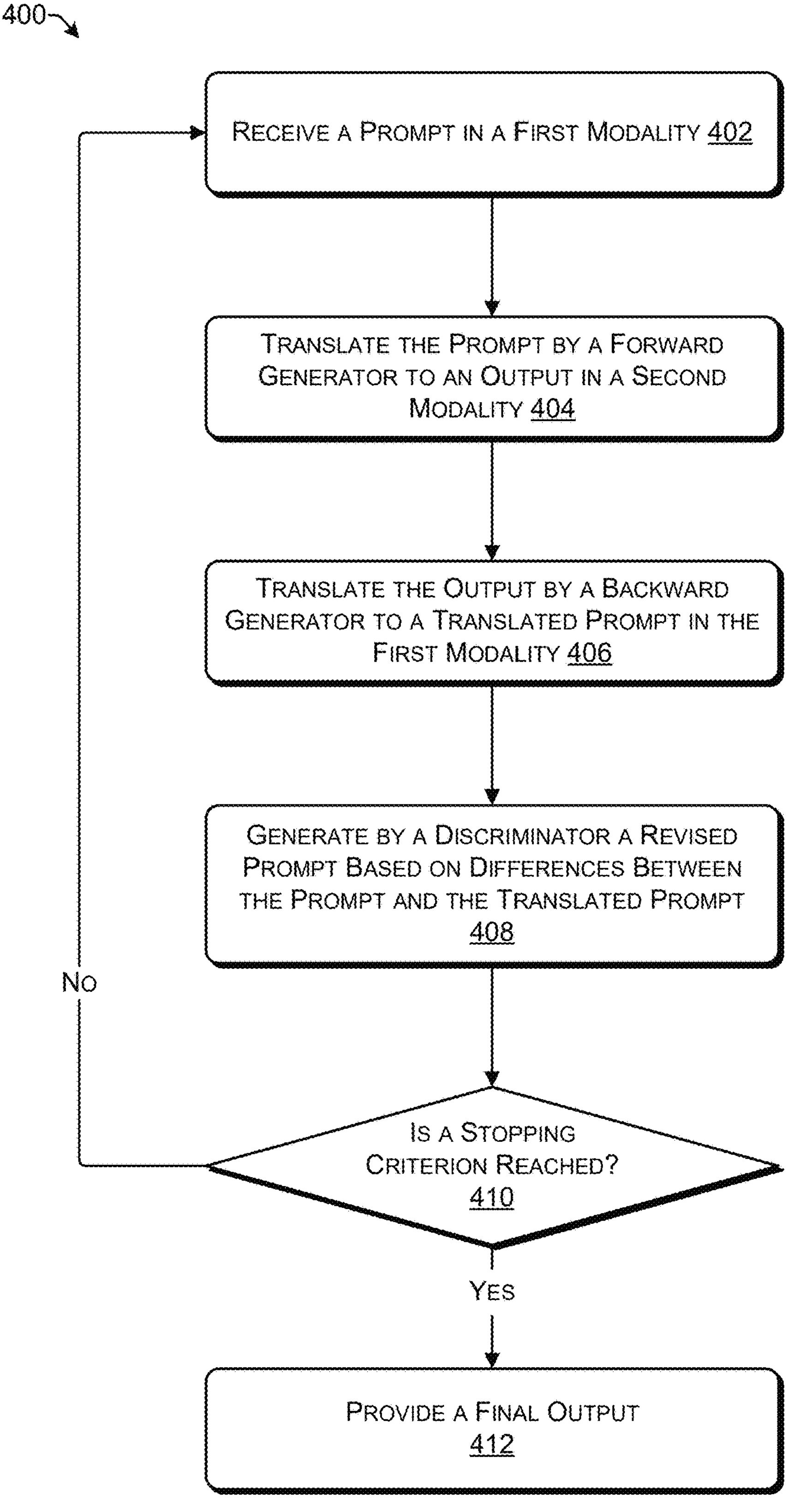
FIG. 4 is a flow diagram showing an illustrative process for refining a prompt to improve modality translation.

FIG. 4 illustrates aspects of a process 400 for refining a prompt to improve modality translation. The process 400 may be implemented by the architecture 100 introduced in FIG. 1, the computer architecture 700 introduced in FIG. 7, or the computing environment 800 illustrated in FIG. 8.

At operation 402, a prompt is received in the first modality. The prompt itself may be natural language text or it may be in any other modality such as an image or code. In some implementations, the prompt comprises a task specification indicating the task to be performed and input data to which the task applies. For example, when translating from code to natural language text, the task could be "Given the following code: lease describe the function of the code." In this example, the code is the input data.

At operation 404, the prompt is translated by a forward generator to an output in a second modality. The forward generator may be a model such as an LLM or LMM. The model can be used unmodified.

At operation 406, the output is translated by a backward generator to a translated prompt in the first modality. The backward generator may be a model like the forward generator and may even be the same model. The backward generator, like the forward generator, may be used as is without any modifications. Following backward translation, the information represented by the prompt has been translated to a different modality and then reverse translated back to the original modality. Differences between the prompt and the translated prompt arise from information lost or added based on the translations through the forward generator and the backward generator. In some implementations, the translated prompt comprises the task specification and reverse translated data. That is, the task specification is the same in the prompt and the reverse translated prompt; however, the data changes. Thus, both the prompt and the reverse translated prompt may include the same instructions such as "Given the following code: please describe the function of the code" but the actual code, the data, would be different.

At operation 408, a revised prompt is generated by the discriminator based on differences between the prompt and translated prompt that are both in the first modality. The discriminator may also be a model and may be the same or different from either the forward generator or the backward generator. In some implementations, generating the revised prompt comprises creating a hint by the discriminator based on the differences between the prompt and the translated prompt. The hint by itself is not the translated prompt but rather an indication or instruction of how to revise the prompt to minimize the difference after forward and backward translation. The hint refines the prompt to improve the generation of the following cycle. In some implementations, the revised prompt is a concatenation of the hint and the prompt. For example, if the hint and the prompt are both natural language text, then the revised prompt may be a text string that includes the prompt and the hint.

At operation 410, it is determined if a stopping criterion is reached. A stopping criterion is a criterion that will stop the method from repeating subsequent cycles. If the stopping criterion is not reached, process 400 continues repeating the previous operations by returning along the "no" path to operation 402. When returning to operation 402, the revised prompt generated at operation 408 is used as the prompt in the first modality. Thus, the revised prompt created by the discriminator in one cycle becomes the input prompt for the next cycle. If the stopping criterion is reached, process 400 proceeds along the "yes" path to operation 412.

One possible stopping criterion is achieving cycle consistency. Cycle consistency is achieved when the prompt coming out of the backward generator is the same as the prompt that was previously provided to the forward generator. The similarity or identity between the two prompts is detected by the discriminator. Cycle consistency may also be defined less rigidly in terms of a "fuzzy match" in which the two prompts are similar but not identical. That is, the stopping criterion may be a determination the differences are less than a threshold amount. The threshold amount may be set as a threshold such as 99% similarity, 98% similarity, 97% similarity, and so forth. The specific features considered for determining similarity will vary with the modality of the prompt. For natural language prompts, text alignment measures can be used to quantify the alignment or degree of matching between the prompt and the translated prompt. There are many metrics known to those of ordinary skill in the art for measuring text alignment of translations that may be used including, but not limited to, the Bilingual Evaluation Understudy (BLEU) score. In some implementations, the discriminator may create high-dimensional vectors representing the prompt and the translated prompt and the threshold similarity may be based on a distance between those vectors measured in vector space such as Euclidean distance and Cosine distance. As mentioned above, in some implementations, the threshold amount may be zero indicating that the revised prompt is the same as the prompt.

Alternatively, the stopping criterion could be based on something other than cycle consistency. For example, the stopping criterion could be a predetermined number of cycles. This number can be any number such as 2, 3, 4, 5, 6, 7, 8, 9, 10, and so forth. Once the predetermined number of cycles is reached, process 400 will proceed to operation 412 regardless of the similarity or dissimilarity between the prompt and the translated prompt. Other stopping criteria could be based on resource usage such as memory, computer, electricity, time, etc. Once a predetermined amount of a resource is used, process 400 will proceed to operation 412.

At operation 412, a final output is provided. The final output is an output in the second modality created by the forward generator. For example, the forward generator may translate natural language text to code and in such case the final output would be code. The forward generator can produce this type of output without the iterative cycles of forward and backward translation and comparisons by the discriminator. However, by running through multiple cycles and reducing the differences between the prompt and the translated prompt the output will be improved. That is, by translating from natural language text to code then to natural language text and repeating, the code that is finally generated after the stopping criterion has been reached will more accurately reflect the natural language prompt than it would have without this process. This may be thought of as a type of error correction for errors introduced by limitations of the models. This can be analogized to translation between human languages. A translation from English to French creates an output in the modality of the French language, but that translation becomes better if it is run through multiple iterations of forward and backward translation to achieve cycle consistency.

In some implementations, the operation of process 400 is transparent to an end user. In such implementations, the user provides a prompt to the system and receives an output in a different modality. The multiple cycles through process 400 to improve cycle consistency are not surfaced to the user. Thus, the user benefits from a more accurate modality translation but is not provided with any of the intermediate outputs or translated prompts.

Figure 5:
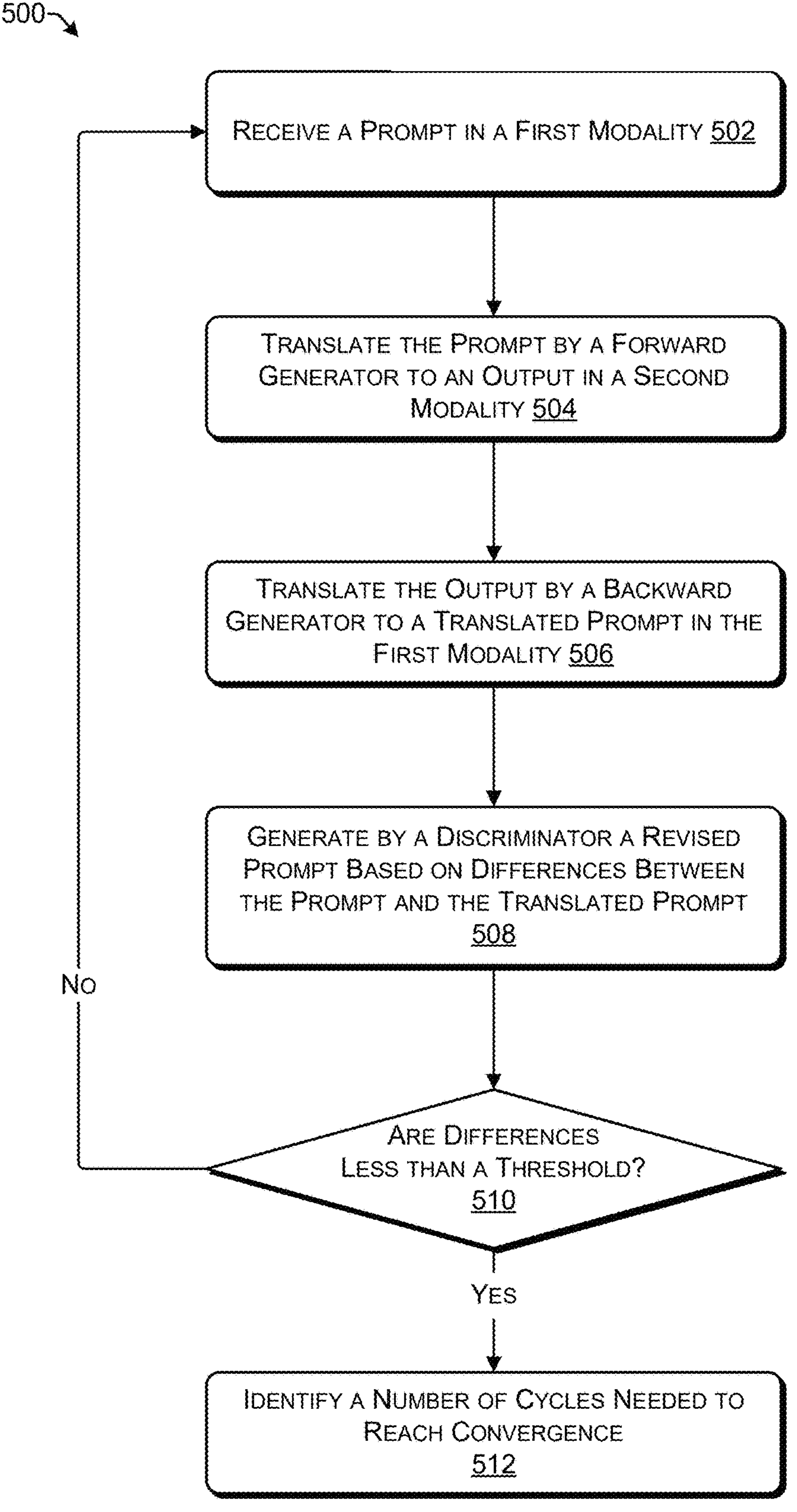
FIG. 5 is a flow diagram showing an illustrative process for refining a prompt to identify a number of cycles of prompt revision needed to reach convergence in modality translation.

FIG. 5 illustrates aspects of a process 500 for refining a prompt to identify a number of cycles of prompt revision needed to reach convergence in modality translation. The process 500 may be implemented by the architecture 100 introduced in FIG. 1, the computer architecture 700 introduced in FIG. 7, or the computing environment 800 illustrated in FIG. 8. Operations 502-510 are the same as operations 402-408 in FIG. 4.

At operation 502, a prompt is received in the first modality. The prompt itself may be natural language text or it may be in any other modality such as an image or code. In some implementations, the prompt comprises a task specification indicating the task to be performed and input data to which the task applies. For example, when translating from code to natural language text, the task could be "Given the following code: please describe the function of the code." In this example, the code is the input data.

At operation 504, the prompt is translated by a forward generator to an output in a second modality. The forward generator may be a model such as an LLM or LMM. The model can be used unmodified.

At operation 506, the output is translated by a backward generator to a translated prompt in the first modality. The backward generator may be a model like the forward generator and may even be the same model. The backward generator, like the forward generator, may be used as is without any modifications. Following backward translation, the information represented by the prompt has been translated to a different modality and then reverse translated back to the original modality. Differences between the prompt and the translated prompt arise from information lost or added based on the translations through the forward generator and the backward generator. In some implementations, the translated prompt comprises the task specification and reverse translated data. That is, the task specification is the same in the prompt and the reverse translated prompt; however, the data changes. Thus, both the prompt and the reverse translated prompt may include the same instructions such as "Given the following code: please describe the function of the code" but the actual code, the data, would be different.

At operation 508, a revised prompt is generated by the discriminator based on differences between the prompt and translated prompt that are both in the first modality. The discriminator may also be a model and may be the same or different from either the forward generator or the backward generator. In some implementations, generating the revised prompt comprises creating a hint by the discriminator based on the differences between the prompt and the translated prompt. The hint by itself is not the translated prompt but rather an indication or instruction of how to revise the prompt to minimize the difference after forward and backward translation. The hint refines the prompt to improve the generation of the following cycle. In some implementations, the revised prompt is a concatenation of the hint and the prompt. For example, if the hint and the prompt are both natural language text, then the revised prompt may be a text string that includes the prompt and the hint.

At operation 510, it is determined if the differences between the prompt and the translated prompt are less than a threshold. This uses an approximate match as a stopping criterion. An exact match in which the differences are zero may also be used. Thus, process 500 will continue repeating the previous operations by returning along the "no" path to operation 502 until cycle consistency (approximate or exact) is achieved. When returning to operation 502, the revised prompt generated at operation 508 is used as the prompt in the first modality. Thus, the revised prompt created by the discriminator in one cycle becomes the input prompt for the next cycle. If the differences are less than the threshold, process 500 proceeds along the "yes" path to operation 512.

The threshold amount may be set as a threshold such as 99% similarity, 98% similarity, 97% similarity, and so forth. The specific features considered for determining similarity will vary with the modality of the prompt. In some implementations, the discriminator may create high-dimensional vectors representing the prompt and the translated prompt and the threshold similarity may be based on a threshold distance between those vectors measured in vector space such as Euclidean distance. As mentioned above, in some implementations, the threshold amount may be zero indicating that the revised prompt is the same as the prompt.

At operation 512, a number of cycles needed to reach convergence is identified. This convergence is represented by the differences between the prompt and the translated prompt being less than a threshold as described above in the description of operation 510. For example, if it takes four cycles through operations 502-508 until the differences are less than a threshold, then the number identified at operation 512 will be four. This number can be used to evaluate the extent of modality alignment between the first modality and the second modality. Models that align well will reach convergence after only a few cycles while models that are poorly aligned will require a greater number of cycles. For example, translation from natural language text to code may reach convergence with relatively few cycles but generating a caption to an image may require many more cycles. A relatively low number of cycles provides some confidence that translation between modalities as implemented by the selected models is accurate and consistent.

This number of cycles—a cycle consistency number—is metadata that can be generated to understand a characteristic of a model that performs modality translation. Another characteristic or metadata about the modality alignment is the trajectory of how the differences decrease. Differences may decrease rapidly during the first few cycles and then reach a kind of plateau where the convergence is slower. Some modality translations may converge very slowly, the differences decrease but it may take a prohibitively large number of cycles for the differences to become less than the threshold. There can also be unstable convergence during in which the differences no longer decrease but vary between increasing slightly and decreasing slightly after each iteration. This behavior indicates that additional iterations will not result in a continued decrease of the differences and convergence may not be able to be achieved. Users may be able to subjectively compare multiple different models and gain a sense that one performs "better" than others on a certain task. However, the techniques of this disclosure that use the refinement of prompts over multiple cycles provide a quantitative metric that can be used to objectively compare models. Different models can be tested for a particular application (e.g., creating a caption of an image) and compared by identifying the respective cycle consistency number for each model when used for that application. The designer of a system could then choose to build the system with the model that has the lowest cycle consistency number. This metric could even be combined with conventional techniques for fine-tuning or retraining the model. Specifically, different varieties of a model created through different fine-tuning, or retraining through transfer learning with different types of data sets could be compared to each other using this technique to identify which technique for modifying the model produces the greatest benefit.

Figure 6:
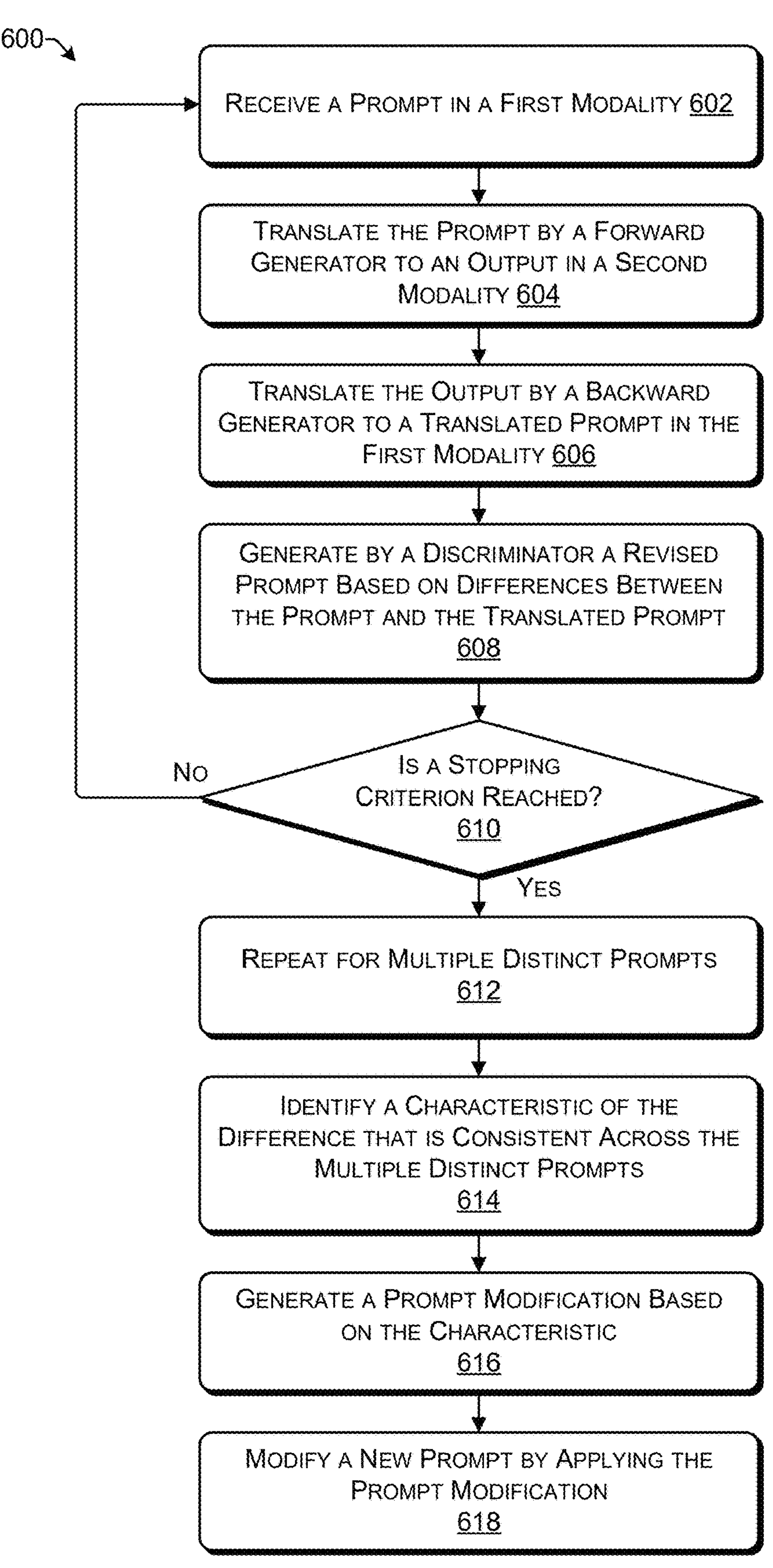
FIG. 6 is a flow diagram showing an illustrative process for refining prompts to identify a characteristic that is consistent across multiple distinct prompts and use a prompt modification generated from that characteristic to modify a new prompt.

FIG. 6 illustrates aspects of a process 600 for refining a prompt to identify a characteristic that is consistent across multiple distinct prompts and use a prompt modification generated from that characteristic to modify a new prompt. The process 600 may be implemented by the architecture 100 introduced in FIG. 1, the computer architecture 700 introduced in FIG. 7, or the computing environment 800 illustrated in FIG. 8. Operations 602-610 are the same as operations 402-410 in FIG. 4.

At operation 602, a prompt is received in the first modality. The prompt itself may be natural language text or it may be in any other modality such as an image or code. In some implementations, the prompt comprises a task specification indicating the task to be performed and input data to which the task applies. For example, when translating from code to natural language text, the task could be "Given the following code: please describe the function of the code." In this example, the code is the input data.

At operation 604, the prompt is translated by a forward generator to an output in a second modality. The forward generator may be a model such as an LLM or LMM. The model can be used unmodified.

At operation 606, the output is translated by a backward generator to a translated prompt in the first modality. The backward generator may be a model like the forward generator and may even be the same model. The backward generator, like the forward generator, may be used as is without any modifications. Following backward translation, the information represented by the prompt has been translated to a different modality and then reverse translated back to the original modality. Differences between the prompt and the translated prompt arise from information lost or added based on the translations through the forward generator and the backward generator. In some implementations, the translated prompt comprises the task specification and reverse translated data. That is, the task specification is the same in the prompt and the reverse translated prompt; however, the data changes. Thus, both the prompt and the reverse translated prompt may include the same instructions such as "Given the following code: please describe the function of the code" but the actual code, the data, would be different.

At operation 608, a revised prompt is generated by the discriminator based on differences between the prompt and translated prompt that are both in the first modality. The discriminator may also be a model and may be the same or different from either the forward generator or the backward generator. In some implementations, generating the revised prompt comprises creating a hint by the discriminator based on the differences between the prompt and the translated prompt. The hint by itself is not the translated prompt but rather an indication or instruction of how to revise the prompt to minimize the difference after forward and backward translation. The hint refines the prompt to improve the generation of the following cycle. In some implementations, the revised prompt is a concatenation of the hint and the prompt. For example, if the hint and the prompt are both natural language text, then the revised prompt may be a text string that includes the prompt and the hint.

At operation 610, it is determined if a stopping criterion is reached. A stopping criterion is a criterion that will stop the method from repeating subsequent cycles. If the stopping criterion is not reached, process 600 continues repeating the previous operations by returning along the "no" path to operation 602. When returning to operation 602, the revised prompt generated at operation 608 is used as the prompt in the first modality. Thus, the revised prompt created by the discriminator in one cycle becomes the input prompt for the next cycle. If the stopping criterion is reached, process 600 proceeds along the "yes" path to operation 612.

One possible stopping criterion is achieving cycle consistency. Cycle consistency is achieved when the prompt coming out of the backward generator is the same as the prompt that was previously provided to the forward generator. The similarity or identity between the two prompts is detected by the discriminator. Cycle consistency may also be defined less rigidly in terms of a "fuzzy match" in which the two prompts are similar but not identical. That is, the stopping criterion may be a determination the differences are less than a threshold amount. The threshold amount may be set as a threshold such as 99% similarity, 98% similarity, 97% similarity, and so forth. The specific features considered for determining similarity will vary with the modality of the prompt. In some implementations, the discriminator may create high-dimensional vectors representing the prompt and the translated prompt and threshold similarity may be based on a distance between those vectors measured in vector space such as Euclidean distance. As mentioned above, in some implementations, the threshold amount may be zero indicating that the revised prompt is the same as the prompt.

Alternatively, the stopping criterion could be based on something other than cycle consistency. For example, the stopping criterion could be a predetermined number of cycles. This number can be any number such as 2, 3, 4, 5, 6, 7, 8, 9, 10, and so forth. Once the predetermined number of cycles is reached, process 600 will proceed to operation 612 regardless of the similarity or dissimilarity between the prompt and the translated prompt. Other stopping criteria could be based on resource usage such as memory, computer, electricity, time, etc. Once a predetermined amount of a resource is used, process 600 will proceed to operation 612.

At operation 612, operations 602-610 are repeated for multiple distinct prompts. That is, entirely different starting prompts are used and iteratively revised until a stopping criterion is reached for each. This may be done for any number of different prompts such as, for example, between 5-50 different prompts. For example, these operations could be repeated to generate captions for 10 different images. Each of the multiple distinct prompts will be in the first modality.

At operation 614, a characteristic of the difference that is consistent across multiple distinct prompts is identified. For each of the multiple distinct prompts differences are identified during each cycle of prompt revision as described above. In some instances, these differences may be represented by a hint generated by the discriminator. Because each prompt is distinct the differences and/or the hint will be different. However, there may be a characteristic of the difference that appears in the revisions to many of the different prompts. For example, if the task is to capture images, differences related to color may be frequently identified. That is, the results of forward translation and then backward translation results in a modification to the prompt that somehow emphasizes aspects of color in the image. This could be as simple as text in a prompt that states: "Pay close attention to the original colors in the image." This characteristic is something that appears in multiple prompt modifications and thus is useful generally for improving prompts in a given modality translation. It can be thought of as a generalizable characteristic of the prompt revision that applies to not just one specific input but to most instances of that class of input.

At operation 616, a prompt modification is generated based on the characteristic. The prompt modification is a specific way to modify the original prompt. For example, if the original prompt is an image, the modification could be altering the image to increase contrast, make solid lines darker and heavier, or something else. The prompt modification could be thought of as a "magic phrase" that when included in multiple different types of prompts results in the model performing a more accurate translation between modalities. Of course, it does not necessarily have to be a natural language phrase as shown by the example of modifying images.

At operation 618, a new prompt is modified by applying the prompt modification generated at operation 616. This new prompt is a prompt in the same modality as the original prompt but one that has not yet been revised through iterative cycles of forward and backward translation. The prompt modification is applied to the new prompt prior to passing it through the forward generator. Specifically, applying comprises modifying the new prompt based on the prompt modification. The specific ways in which modification will be implemented depend on the modality of the prompt and the type of prompt modification. Thus, knowledge learned about how to modify other prompts is applied to this new prompt before it is passed to the forward generator. With this technique, information learned about how to modify prompts outside of the current cycle can be applied as a naïve modification to this new prompt. In some implementations the prompt modification will be sufficient for the forward generator to generate a suitable output. That is, a modality translation or sufficient quality is achieved without the process of cycle-consistent refinement. However, in other implementations the new prompt modified by the prompt modification is passed through the iterative process described in this disclosure. Including the prompt modification from the very beginning gives the new prompt a head start on achieving cycle consistency and reduces the number of cycles until the differences between the new prompt and the translated prompt are less than a threshold amount.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by processor(s) executing computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special-purpose digital logic, and any combination thereof.

Illustrative Computing Architectures and Environments

Figure 7:
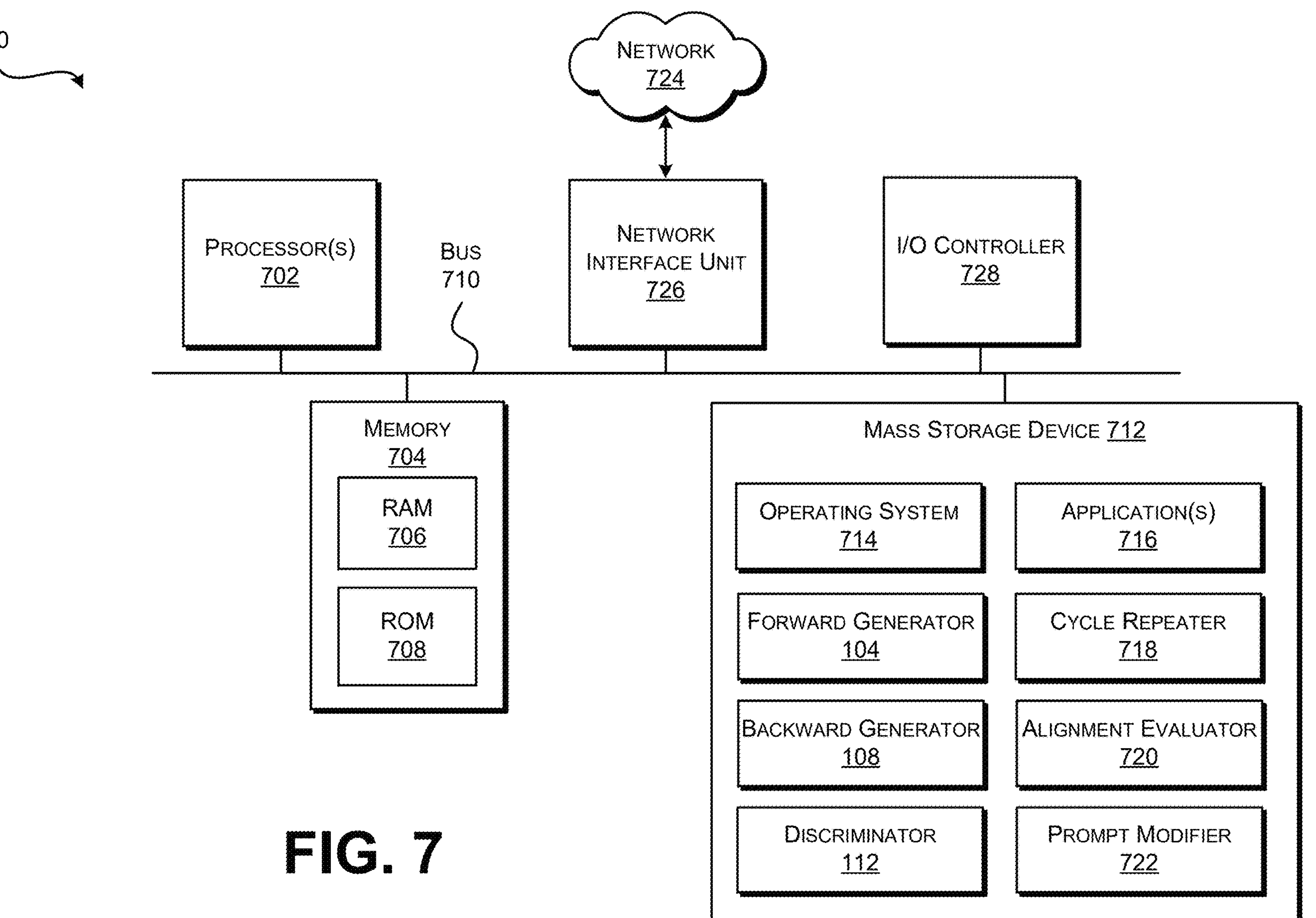
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server capable of executing computer instructions (e.g., a module or a program component described herein). The computer architecture 700 illustrated in FIG. 7 includes processor(s) 702, a system memory 704, including a random-access memory 706 (RAM) and a read-only memory (ROM) 708, and a system bus 710 that couples the system memory 704 to the processor(s) 702. In various examples, the processor (s) 702 are distributed. Stated another way, one processor 702 may be located in a first location (e.g., a rack within a datacenter) while another processor 702 is located in a second location separate from the first location. For example, the processor(s) 702 can include graphical processing units (GPUs) for executing complex artificial intelligence models such as LLMs and LMMs. Moreover, the systems discussed herein can be provided as a distributed computing system such as a cloud service.

Processor(s) 702 can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 on which an operating system 714, application(s) 716, and other data described herein are encoded.

Other data or modules may be contained within the mass storage device 712 include the forward generator 104, the backward generator 108, and the discriminator 112. The forward generator 104 is configured to translate a prompt in a first modality to an output in a second modality. The backward generator 108 is configured to translate the output to a translated prompt in the first modality. The discriminator 112 is configured to generate a revised prompt based on differences between the prompt and the translated prompt both in the first modality. Although shown within the mass storage device 712, it is also contemplated that models used to implement one or more of the forward generator 104, the backward generator 108, and the discriminator 112 may be stored remotely and accessed via the network 724. For example, the LLM or LMM used to implement one of the modules may be located in the cloud and accessed using the network 724.

Additional data or modules that may be contained in the mass storage device 712 include a cycle repeater 718, an alignment evaluator 720, and a prompt modifier 722. The cycle repeater 718 is configured to provide a revised prompt to the forward generator 104 until a stopping criterion is reached. Thus, the cycle repeater 718 determines if the cycle is repeated for another iteration. As mentioned above, the stopping criterion could be the completion of a predetermined number of cycles, convergence represented by zero difference between the prompt provided to the forward generator 104 and the prompt output by the backward generator 108, or approximate convergence when the incoming prompt and outgoing prompt differ by less than a threshold amount.

The alignment evaluator 720 is configured to evaluate the extent of model alignment that are responsible for different modalities by identifying a number of cycles needed until the differences are less than a threshold amount. The extent of modality alignment may be measured by the number of cycles needed to reach convergence. This number may be identified and stored by the alignment evaluator 720. The absence of convergence of the pattern of the variance in outputs may also be used to characterize modality alignment. For example, if the differences between a prompt and a translated prompt remain and the type of the differences continue to change, then the alignment is unstable. If alignment between two modalities requires a large number of cycles or complete alignment is never reached, this indicates that the models involved in forward translation and backward translation do not communicate well. If the alignment evaluator 720 finds that two modalities align well, this provides some level of confidence that the translation between the modalities will be accurate and reliable. When models are well aligned for particular modalities, the prompt is faithfully translated to the other modality.

The prompt modifier 722 is configured to identify a characteristic of the difference that is consistent across multiple distinct prompts. That is the prompt modifier 722 looks at the types of changes made to many different prompts as they are translated back and forth across the same two modalities. The prompt modifier 722 considers aggregate behavior not across multiple cycles dealing with the same starting prompt but with multiple entirely distinct starting prompts. If, there is some consistent characteristic that is present in the way the different prompts are modified after repeated cycles that characteristic is identified as something that can be generalized and applied to most any prompt. Accordingly, the prompt modifier 722 generates a new prompt modification based on the characteristic. The prompt modifier 722 then applies a prompt modification to a new prompt before the new prompt is passed through the forward generator 104. This represents learning from the type of prompt modifications that were advantageous in the past and applying it going forward to a new prompt as a naïve modification before that prompt is translated into another modality or even enters the prompt revision cycle shown in FIG. 1.

The mass storage device 712 is connected to processor(s) 702 through a mass storage controller connected to the system bus 710. The mass storage device 712 and its associated computer-readable media provide non-volatile storage for the computer architecture 700. Although the description of computer-readable media contained herein refers to a mass storage device, the computer-readable media can be any available computer-readable storage media or communication media that can be accessed by the computer architecture 700.

Computer-readable media includes both computer-readable storage media and communication media. Computer-readable storage media includes one or more of volatile memory, nonvolatile memory, and/or other persistent and/or auxiliary computer storage media, removable and non-removable computer storage media implemented in any method or technology for encoding of information such as computer-readable instructions, data structures, program modules, or other data. Thus, computer-readable storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media embodies computer-readable instructions, data structures, program modules, or other data in a modulated data signal, such as a carrier wave, or other transmission mechanism. Computer-readable storage media and communication media are mutually exclusive. Thus, as defined herein, computer-readable storage media does not include communication media. That is, computer-readable storage media does not include media consisting solely of a modulated data signal, a carrier wave, or a propagated signal, per se.

According to various configurations, the computer architecture 700 may operate in a networked environment using logical connections to remote computers through the network 724. The computer architecture 700 may connect to the network 724 through a network interface unit 726 connected to the system bus 710. The computer architecture 700 also may include an input/output controller 728 for receiving and processing input from a number of other devices, including a keyboard, mouse, touch, or electronic stylus or pen. Similarly, the input/output controller 728 may provide output to a display screen, a printer, or other type of output device.

The software components described herein may, when loaded into the processor(s) 702 and executed, transform the processor(s) 702 and the overall computer architecture 700 from a general-purpose computing system into a special-purpose computing system customized to facilitate the functionality presented herein. The processor(s) 702 may be constructed from any number of transistors or other discrete circuit elements, which may individually or collectively assume any number of states. More specifically, the processor(s) 702 may operate as a finite-state machine, in response to executable instructions contained within the software modules disclosed herein and encoded on the mass storage device 712. These computer-executable instructions may transform the processor(s) 702 by specifying how the processor(s) transitions between states, thereby transforming the transistors or other discrete hardware elements constituting the processor(s) 702.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the prompt refinement described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "computing devices 806") can communicate with the computing environment 802 via the network 804. In one illustrated configuration, the computing devices 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of computing devices 806 can communicate with the computing environment 802.

In various examples, the computing environment 802 includes application servers 808, data storage 810, and one or more network interfaces 812. The application servers 808 can host various services, models, virtual machines, portals, and/or other resources. In the illustrated configuration, the application servers 808 host an LLM 814, an LMM 816, database services 818, storage services 820, and/or virtual machines 822. As shown in FIG. 8 the application servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 can also be provided by one or more servers configured to host data for the distributed computing environment 800. The data storage 810 can include, host, or provide one or more real or virtual datastores 826A-826N (hereinafter referred to collectively and/or generically as "datastores 826"). The datastores 826 are configured to host data used or created by the application servers 808 and/or other data. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including the computing devices 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices 806 can include real or virtual machines including server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

ILLUSTRATIVE EMBODIMENTS

The following clauses describe multiple possible embodiments for implementing the features described in this disclosure. The various embodiments described herein are not limiting nor is every feature of any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method for improving modality translation by a model comprising: receiving a prompt (102) in a first modality; translating the prompt by a forward generator (104) to an output (106) in a second modality; translating the output by a backward generator (108) to a translated prompt in the first modality; generating, by a discriminator (112), a revised prompt (116) based on differences (114) between the prompt and the translated prompt both in the first modality; and repeating the previous steps until a stopping criterion (410) is reached.

Clause 2. The method of clause 1, wherein the prompt in the first modality comprises a task specification and input data.

Clause 3. The method of clause 2, wherein the translated prompt comprises the task specification and reverse translated data.

Clause 4. The method of any of clauses 1 to 3, wherein the generating the revised prompt comprises creating a hint by the discriminator based on the differences between the prompt and the translated prompt and the revised prompt is a concatenation of the hint and the prompt.

Clause 5. The method of any of clauses 1 to 4, wherein the stopping criterion is a predetermined number of cycles.

Clause 6. The method of any of clauses 1 to 4, wherein the stopping criterion is a determination that the differences are less than a threshold amount.

Clause 7. The method of clause 6, wherein the threshold amount is zero indicating that the revised prompt is the same as the prompt.

Clause 8. The method of clause 6, further comprising identifying a number of cycles needed until the differences are less than the threshold amount.

Clause 9. The method of any of clauses 1 to 8, further comprising, once the stopping criterion is reached, providing a final output.

Clause 10. The method of any of clauses 1 to 8, further comprising: repeating the previous steps for multiple distinct prompts; identifying a characteristic of the difference that is consistent across the multiple distinct prompts; generating a prompt modification based on the characteristic; and modifying a new prompt prior to passing the new prompt through the forward generator by applying the prompt modification.

Clause 11. A system comprising one or more processors and memory coupled to the processors containing instructions that, when executed, cause the system to perform the method of any of clauses 1 to 10.

Clause 12. Computer-readable storage media comprising instructions that when executed by a processor cause a computing device to perform the method of any of clauses 1 to 10.

Clause 13. A system for improving modality translation by a model comprising: one or more processors; (702) memory coupled to the one or more processors; (704) a forward generator (104) configured to translate a prompt in a first modality to an output in a second modality, wherein the forward generator is optionally configured to be stored in the memory and implemented by the one or more processors; a backward generator (108) configured to translate the output to a translated prompt in the first modality, wherein the backward generator is optionally configured to be stored in the memory and implemented by the one or more processors; and a discriminator (112), wherein the discriminator is optionally configured to be stored in the memory and implemented by the one or more processors.

Clause 14. The system of clause 13, further comprising a cycle repeater configured to provide the revised prompt to the forward generator until a stopping criterion is reached, wherein the cycle repeater is optionally configured to be stored in the memory and implemented by the one or more processors.

Clause 15. The system of clause 14, wherein the stopping criterion is (i) a predetermined number of cycles or (ii) a determination that the differences are less than a threshold amount.

Clause 16. The system of any of clauses 13 to 15, wherein the prompt in the first modality comprises a task specification and input data.

Clause 17. The system of any of clauses 13 to 16, wherein the discriminator is further configured to generate a hint based on the differences between the prompt and the translated prompt and to generate the revised prompt by concatenating the hint and the prompt.

Clause 18. The system of any of clauses 13 to 17, further comprising an alignment evaluator configured to evaluate an extent of modality alignment by identifying a number of cycles needed until the differences are less than a threshold amount, wherein the alignment evaluator is optionally configured to be stored in the memory and implemented by the one or more processors.

Clause 19. The system of any of clauses 13 to 17, further comprising a prompt modifier configured to identify a characteristic of the difference that is consistent across multiple distinct prompts, generate a prompt modification based on the characteristic, and apply the prompt modification to a new prompt before the new prompt is passed through the forward generator, wherein the prompt modifier is optionally configured to be stored in the memory and implemented by the one or more processors.

Clause 20. Computer-readable storage media comprising instructions that when executed by a processor cause a computing device to perform acts comprising: receiving a prompt (102) in a first modality; translating the prompt by a forward generator (104) to an output (106) in a second modality; translating the output by a backward generator (108) to a translated prompt (110) in the first modality; generating, by a discriminator (112), a revised prompt (116) based on differences between the prompt and the translated prompt both in the first modality; and repeating the previous steps until a stopping criterion is reached.

Clause 21. The computer-readable storage media of clause 20, wherein the prompt in the first modality comprises a task specification and input data and the translated prompt comprises the task specification and reverse translated data.

Clause 22. The computer-readable storage media of any of clauses 20 or 21, wherein the generating the revised prompt comprises creating a hint by the discriminator based on the differences between the prompt and the translated prompt and the revised prompt is a concatenation of the hint and the prompt.

CONCLUSION

While certain example embodiments have been described, including the best mode known to the inventors for carrying out the invention, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

Conditional language such as, among others, “can,” “could,” “might” or “may,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase “at least one of X, Y or Z,” unless specifically stated otherwise, is to be understood to present that an item, term, etc. may be either X, Y, or Z, or a combination thereof.

The terms “a,” “an,” “the” and similar referents used in the context of describing the invention (especially in the context of the following claims) are to be construed to cover both the singular and the plural unless otherwise indicated herein or clearly contradicted by context. The terms “based on,” “based upon,” and similar referents are to be construed as meaning “based at least in part” which includes being “based in part” and “based in whole” unless otherwise indicated or clearly contradicted by context. The terms “portion,” “part,” or similar referents are to be construed as meaning at least a portion or part of the whole including up to the entire noun referenced.

In addition, any reference to “first,” “second,” etc. elements within the Summary and/or Detailed Description is not intended to and should not be construed to necessarily correspond to any reference of “first,” “second,” etc. elements of the claims. Rather, any use of “first” and “second”

within the Summary, Detailed Description, and/or claims may be used to distinguish between two different instances of the same element (e.g., two different models).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for improving modality translation by a model comprising:

(a) receiving a prompt in a first modality;

(b) translating the prompt by a forward generator to an output in a second modality;

(c) translating the output by a backward generator to a translated prompt in the first modality;

(d) generating, by a discriminator, a revised prompt based on differences between the prompt and the translated prompt both in the first modality; and repeating steps (a)-(d) until a stopping criterion is reached.

2. The method of claim 1, wherein the prompt in the first modality comprises a task specification and input data.

3. The method of claim 2, wherein the translated prompt comprises the task specification and reverse translated data.

4. The method of claim 1, wherein the generating the revised prompt comprises creating a hint by the discriminator based on the differences between the prompt and the translated prompt and the revised prompt is a concatenation of the hint and the prompt.

5. The method of claim 1, wherein the stopping criterion is a predetermined number of cycles.

6. The method of claim 1, wherein the stopping criterion is a determination that the differences are less than a threshold amount.

7. The method of claim 6, wherein the threshold amount is zero indicating that the revised prompt is the same as the prompt.

8. The method of claim 6, further comprising identifying a number of cycles needed until the differences are less than the threshold amount.

9. The method of claim 1, further comprising, once the stopping criterion is reached, providing a final output.

10. The method of claim 1, further comprising:

repeating steps (a)-(d) for multiple distinct prompts;

identifying a characteristic of the differences that is consistent across the multiple distinct prompts;

generating a prompt modification based on the characteristic; and modifying a new prompt prior to passing the new prompt through the forward generator by applying the prompt modification.

11. A system for improving modality translation by a model comprising:

one or more processors;

memory coupled to the one or more processors;

a forward generator configured to translate a prompt in a first modality to an output in a second modality;

a backward generator configured to translate the output to a translated prompt in the first modality; and a discriminator configured to generate a revised prompt based on differences between the prompt and the translated prompt both in the first modality.

12. The system of claim 11, further comprising a cycle repeater configured to provide the revised prompt to the forward generator until a stopping criterion is reached.

13. The system of claim 12, wherein the stopping criterion is (i) a predetermined number of cycles or (ii) a determination that the differences are less than a threshold amount.

14. The system of claim 11, wherein the prompt in the first modality comprises a task specification and input data.

15. The system of claim 11, wherein the discriminator is further configured to generate a hint based on the differences between the prompt and the translated prompt and to generate the revised prompt by concatenating the hint and the prompt.

16. The system of claim 11, further comprising an alignment evaluator configured to evaluate an extent of modality alignment by identifying a number of cycles needed until the differences are less than a threshold amount.

17. The system of claim 11, further comprising a prompt modifier configured to identify a characteristic of the differences that is consistent across multiple distinct prompts, generate a prompt modification based on the characteristic, and apply the prompt modification to a new prompt before the new prompt is passed through the forward generator.

18. Computer-readable storage media comprising instructions stored in memory that when executed by a processor cause a computing device to perform acts comprising:

(a) receiving a prompt in a first modality;

(b) translating the prompt by a forward generator to an output in a second modality;

(c) translating the output by a backward generator to a translated prompt in the first modality;

(d) generating, by a discriminator, a revised prompt based on differences between the prompt and the translated prompt both in the first modality; and repeating steps (a)-(d) until a stopping criterion is reached.

19. The computer-readable storage media of claim 18, wherein the prompt in the first modality comprises a task specification and input data and the translated prompt comprises the task specification and reverse translated data.

20. The computer-readable storage media of claim 18, wherein the generating the revised prompt comprises creating a hint by the discriminator based on the differences between the prompt and the translated prompt and the revised prompt is a concatenation of the hint and the prompt.

* * * * *